US008662020B1

(12) United States Patent
Tecco

(10) Patent No.: US 8,662,020 B1
(45) Date of Patent: Mar. 4, 2014

(54) ANIMAL CARRIER

(76) Inventor: Peter Vincent Tecco, Carneys Point, NJ (US)

( * ) Notice: Subject to any disclaimer, the term of this patent is extended or adjusted under 35 U.S.C. 154(b) by 762 days.

(21) Appl. No.: 12/207,259

(22) Filed: Sep. 9, 2008

Related U.S. Application Data

(60) Provisional application No. 60/971,687, filed on Sep. 12, 2007, provisional application No. 61/080,881, filed on Jul. 15, 2008.

(51) Int. Cl.
*A01K 1/02* (2006.01)
(52) U.S. Cl.
USPC .......................................................... 119/497
(58) Field of Classification Search
USPC ............... 119/416–481, 482–501; 43/55–56; 220/560; 441/35, 38, 40, 42, 43, 441/129–132; 114/349, 351
See application file for complete search history.

(56) References Cited

U.S. PATENT DOCUMENTS

| 744,590 | A | * | 11/1903 | Moore | 114/39.28 |
| 1,065,400 | A | * | 6/1913 | Spaulding | 114/349 |
| 1,249,645 | A | * | 12/1917 | Lundin | 114/349 |
| 1,299,476 | A | * | 4/1919 | Katko | 114/349 |
| 2,149,996 | A | * | 3/1939 | Gulden | 43/56 |
| 2,560,054 | A | * | 7/1951 | Wells | 43/55 |
| 2,928,108 | A | * | 3/1960 | Cochrane et al. | 114/345 |
| 3,037,218 | A | * | 6/1962 | Brooks, III | 441/38 |
| 3,509,855 | A | * | 5/1970 | Priddy, Jr. | 119/497 |
| 3,787,912 | A | * | 1/1974 | Huey, Jr. | 114/351 |
| 3,843,983 | A | * | 10/1974 | Tangen | 441/38 |
| 3,883,913 | A | * | 5/1975 | Givens | 441/37 |
| 4,019,459 | A | * | 4/1977 | Neff | 119/223 |
| 4,127,214 | A | | 11/1978 | Pedraza | |
| 4,533,333 | A | * | 8/1985 | Andrew et al. | 441/38 |
| 4,926,781 | A | * | 5/1990 | Bauer | 114/351 |
| 4,927,041 | A | | 5/1990 | Hepburn | |
| 5,123,198 | A | * | 6/1992 | Von Grossmann | 43/55 |
| 5,136,981 | A | | 8/1992 | Barreto | |
| 5,540,469 | A | | 7/1996 | Albert | |
| 5,615,640 | A | | 4/1997 | Luiz | |
| 5,632,235 | A | | 5/1997 | Larsen | |
| 5,894,816 | A | | 4/1999 | Coiro | |

(Continued)

FOREIGN PATENT DOCUMENTS

WO PCT/US2008/063625 11/2009
WO WO 2009/139775 A1 11/2009

OTHER PUBLICATIONS

Declaration by Peter Tecco dated Feb. 4, 2010.
Declaration by Peter Tecco dated Feb. 27, 2010—display at duck hunt (total 4 pages).

(Continued)

*Primary Examiner* — Kimberly Berona
*Assistant Examiner* — Danielle Clerkley
(74) *Attorney, Agent, or Firm* — Stephen G Stanton

(57) ABSTRACT

An animal carrier comprising: a housing connected with a base to form a cavity wherein an animal can be contained in said cavity. The base is adapted to float on water and to be moved over water. The base has a top and bottom. The top has a top area and the bottom has a bottom area. In an option, the top area is greater than or equal to the bottom area. The carrier can be used to transport pets over water, such as in emergencies.

17 Claims, 12 Drawing Sheets

(56) References Cited

U.S. PATENT DOCUMENTS

| | | |
|---|---|---|
| 5,894,817 A | 4/1999 | Manuel |
| 6,024,054 A | 2/2000 | Matt et al. |
| 6,273,774 B1 | 8/2001 | Warzecha |
| 6,302,061 B1 | 10/2001 | Weatherby |
| 6,595,162 B1 | 7/2003 | Hibbert |
| 6,848,394 B1 | 2/2005 | Sexton |
| 7,314,395 B2 | 1/2008 | Bryham |
| 7,357,688 B2 | 4/2008 | Ferrara |

OTHER PUBLICATIONS

Declaration by Peter Tecco dated—Mar. 15, 2010—this declaration is same as previously submitted declaration dated Feb. 4, 2010, except that the following heading is added "I, Peter V. Tecco, hereby do declare the following:".

Pdf retrieved from http://tmportal.uspto.gov/external/portal/tow?SRCH=Y&isSubmitted=true&details=&SELECT=US+Serial+No&TEXT=77287649.

\* cited by examiner

ANIMAL CARRIER

CROSS REFERENCE TO RELATED APPLICATIONS

This patent application is a regular patent application (non-provisional) that claims priority at least under 35 U.S.C. 119(e) from the following provisional applications:

U.S. provisional patent application Ser. No. 60/971,687, File date 12 Sep. 2007, Inventor: Peter Vincent Tecco, Title: This lightweight Pet Cage can float and be lowered in water for emergency purposes; confirmation no. 4212, and U.S. provisional Application No. 61/080,881, Filing Date: Jul. 15, 2008, Confirmation Number: 6978, Inventor Peter Vincent Tecco, Title of Invention: Animal Carrier.

The above applications are herein incorporated by reference in their entirety.

BACKGROUND OF INVENTION

1) Field of the Invention

This invention relates generally to animal carriers and more particularly to animal carriers for domestic pets that are buoyant in water or float and can be moved over water.

2) Description of the Prior Art

Natural catastrophes such as floods, earthquakes, hurricanes, cyclones and the like are occurring more frequently over the recent years. When natural calamities occur, often it is unsafe to be out-of-doors and thus humans and their domestic pets seek the safety of a shelter. A conventional outdoor pet shelter, such as a dog house, does not provide adequate protection to the pet during a natural disaster. It is believed that animals can often detect the preliminary stages of a natural disaster, such as an earthquake, before the disaster is detected by their human counterparts. When this occurs, animals often become frightened and seek a hiding place.

Animal carriers may be used to transport animals, such as pets, from place to place. There is a need for improved animal carriers.

SUMMARY OF THE INVENTION

An example embodiment of the present invention provides a structure for an animal carrier which is characterized as follows. An animal carrier comprising:
 a housing connected with a base to form a cavity wherein an animal can be contained in the cavity;
 the base is adapted to float on water and to be moved over water.

In an option, the base has a top and bottom; the top has a top horizontal cross-sectional area and the bottom has a bottom horizontal cross-sectional area; the top horizontal cross-sectional area is greater than or equal to the bottom horizontal cross-sectional area.

In another option, the base is comprised of an upper base and a lower base; the upper base has a horizontal cross-sectional area of between about 105 to 150% of the horizontal cross-sectional area of the top surface of the lower base where the lower base meets the upper base; the lower base is comprised of at least 50 volume % of a material having a density less than water.

An option comprises: the housing has a door; the door has a two hinges; the door opens upward; a latch means to secure the door closed.

Another option comprises: the base has a shape and size enabling the carrier with an animal inside to float on water.

In another option, the base may consists of at least 50 volume % and preferably at least 85 volume % of a material that has a density less than water.

In another option, the base may be comprised of an upper base and a lower base. The upper base may consists of at least 80 volume % of a material having a density less than water.

Another example embodiment is a method of transporting or rescuing animals comprising the steps of:
 providing an animal carrier;
  the animal carrier comprising a housing connected with a base to form a cavity wherein an animal can be contained in the cavity;
  base is adapted to float on water and to be moved over water;
  the base has a top and bottom, the top has a top horizontal cross-sectional area and the bottom has a bottom horizontal cross-sectional area; the top horizontal cross-sectional area is greater than or equal to the bottom horizontal cross-sectional area;
 placing an animal in a pet carrier;
 transporting the animal in the carrier by moving the carrier over the water.

In an aspect, the carrier is adapted to be pulled behind a boat in water.

Another example embodiment is a method of rescuing animals comprising the steps of:
 providing an animal carrier;
  the animal carrier comprising a housing connected with a base to form a cavity wherein an animal can be contained in the cavity;
  base is adapted to float on water and to be moved over water;
 placing an animal in a pet carrier;
 transporting the animal in the carrier by moving the carrier over the water.

An option of the above embodiment further includes: lowering the animal carrier from a vertically higher point to a vertically lower point by attaching a line to the handle of the animal carrier and lowering the animal carrier.

In an option, the base has a top and bottom, the top has a top horizontal cross-sectional area and the bottom has a bottom horizontal cross-sectional area; the top area is greater than or equal to the bottom area.

Additional example embodiments are described in the specification, figures and claims.

The above and below advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The features and advantages of an animal carrier according to example embodiments of the present invention will be more clearly understood from the following description taken in conjunction with the accompanying drawings in which like reference numerals designate similar or corresponding elements, regions and portions and in which.

DETAILED DESCRIPTION OF THE EXAMPLE EMBODIMENTS

The example embodiments of the present invention will be described in detail with reference to the accompanying drawings. The example embodiments provide an animal carrier.

The following applications are included herein incorporated by reference in their entirety:

U.S. provisional patent application Ser. No. 60/971,687, File date 12 Sep. 2007, Inventor: Peter Vincent Tecco, Title: This lightweight Pet Cage can float and be lowered in water for emergency purposes; confirmation no. 4212, and U.S. provisional Application No. 61/080,881, Filing Date: Jul. 15, 2008, Confirmation Number: 6978, Inventor Peter Vincent Tecco, Title of Invention: Animal Carrier.

This application claims priority from the above applications.

I. OVERVIEW OF SOME FEATURES OF SOME EXAMPLE EMBODIMENTS

Referring to at least FIGS. 1, 2, 3, 4, and 5, and the descriptions below, an example embodiment is an animal carrier comprising:

a housing connected with a base; a cavity within the housing and the base the base and the housing adapted to hold an animal the cavity;

base is adapted to float on water and to be moved over water;

In an option, the base has a top and bottom, the top has a top horizontal cross-sectional area and the bottom has a bottom horizontal cross-sectional area; the top horizontal cross-sectional area is greater than or equal to the bottom horizontal cross-sectional area.

In an example embodiment, the top horizontal cross-sectional area is greater than the bottom horizontal cross-sectional area.

In an example embodiment, the top horizontal cross-sectional area is greater than the bottom horizontal cross-sectional area;

the top of the base has a top width and a top length;
the top length is larger than the top width;
the bottom of the base has a bottom width and a bottom length; and
the bottom length is larger than the bottom width.

In an example embodiment, the base can be comprised of a material that is buoyant in water or has a lower density than water.

In an example embodiment, wherein the base has a shape and size and overall density enabling the carrier (with animal inside) to float on water and to be towed over and/or through water.

The base can be shaped like boat hull, for example, the top is wider than bottom. For example, the base is has a longer length than width.

II. FIRST EXAMPLE EMBODIMENT

Figure 1:
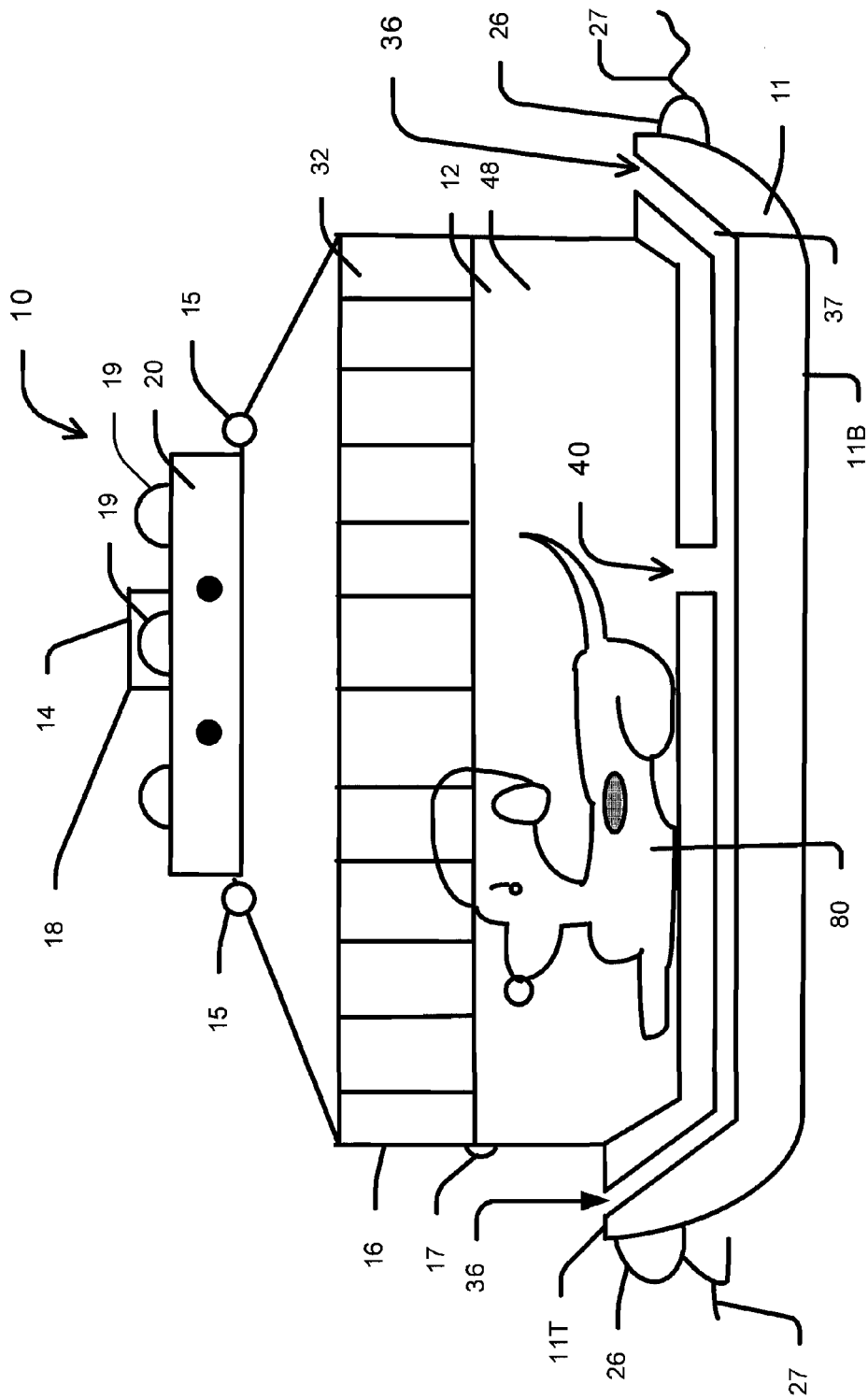
FIG. 1 is cross-sectional view of a carrier holding an animal according to an example embodiment of the present invention.

Referring to FIG. 1, a first example embodiment of an animal carrier comprises: a base 11 and a housing 12.

The housing 12 is connected with the base 11. The housing and base are adapted to hold an animal, such as a pet (e.g., dog, cat, house pets, etc). In an option the animal is not a human.

The base 11 is preferably adapted to float on water and to be moved or towed over and/or through water. The base 11 has a top 11T and bottom 11B. The top 11T has a top horizontal cross-sectional area and the bottom 11B has a bottom horizontal cross-sectional area. The top horizontal cross-sectional area is preferably greater than or equal to the bottom horizontal cross-sectional area.

The base is preferably comprised of a material that is buoyant in water and has a density less than water. For example, the base can be comprised of polyurethane or polystyrene foam covered with layers of fiberglass cloth and polyester or epoxy resin.

The base preferably has a shape and size so that the carrier is buoyant in water. That is that the base can be comprised of material that has a density greater than water, but the overall size and shape of the base/carrier is adapted so that the base/carrier floats on water because the overall weight of the base/carrier is less than water it displaces. In an option, the cross-sectional area of the base along a horizontal plane gets smaller from the top to the bottom. Density is mass ('weight') per volume.

In an option, the base and the housing are one piece. In another option, the base and the housing are separate pieces connected together.

As shown in FIG. 1, a (top) handle 14 is connected with the top housing 12. A door hinge 15 attaches a door 16 to the housing 12.

The housing and base form a cavity 48 where an animal can be held. A door 16 provides access to the cavity.

A door latch 17 allows the door 16 to be held closed or open.

A light 18 can be positioned in or on or connected with the handle 14.

A hook(s) or other attachment devices 19 can be connected with the carrier 10. The hook(s) can be used to lower the carrier down or raise the carrier up. For example a carrier could be raised up from a rescue boat or flood water to a roof of a house. A rope (or multiple ropes) could be attached to the attachment device(s) 19 and the carrier pulled up or lowered down. An animal could be placed within the carrier. The carrier could be lowered back down into the water or into a boat. A harness could be used to attach to several attachment devices (e.g., top, front, back, left side and right side and the harness could be connected with a single line.

As shown in FIG. 1, a compartment 20 for storing items, such as, the lowering rope, is connected with the housing 12. The compartment may have doors on the top and/or sides.

Attachment devices (such as handles 26 (e.g., swimming handles)) can be connected with the base. The handles can be held by people swimming in water alongside the floating carrier. The attachment devices 1016 can be attached to ropes and used to lower the carrier into water.

Line 27 (e.g., rope) can be attached to the handles 26. The lines or ropes 27 can be used to pull the carrier over land or tow the carrier over water.

The housing 12 also can have vents or openings 32.

The base 11 can comprise drain opening(s) 36 in base 11, drain cavity orifice 40 and drain passageways/opening 37. The base can have an about rectangular top down shape.

In an option, the base consists of at least 85 volume % of a material that has a density less than water.

An animal 80 can be placed inside the carrier in a cavity 48 formed in the housing and the base. The animal can be a cat or dog.

III. SECOND EXAMPLE EMBODIMENT

Figure 2:
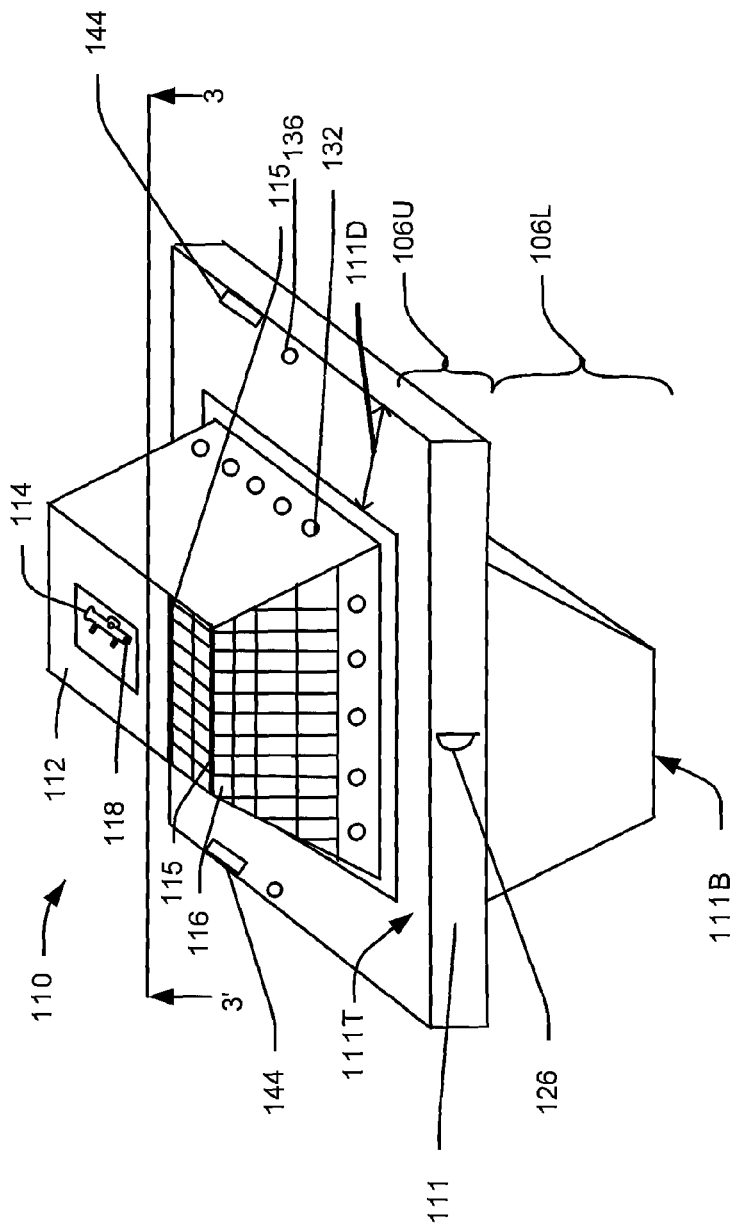
FIG. 2 is a three dimensional view of a carrier and platform according to an example embodiment of the present invention.
Figure 3:
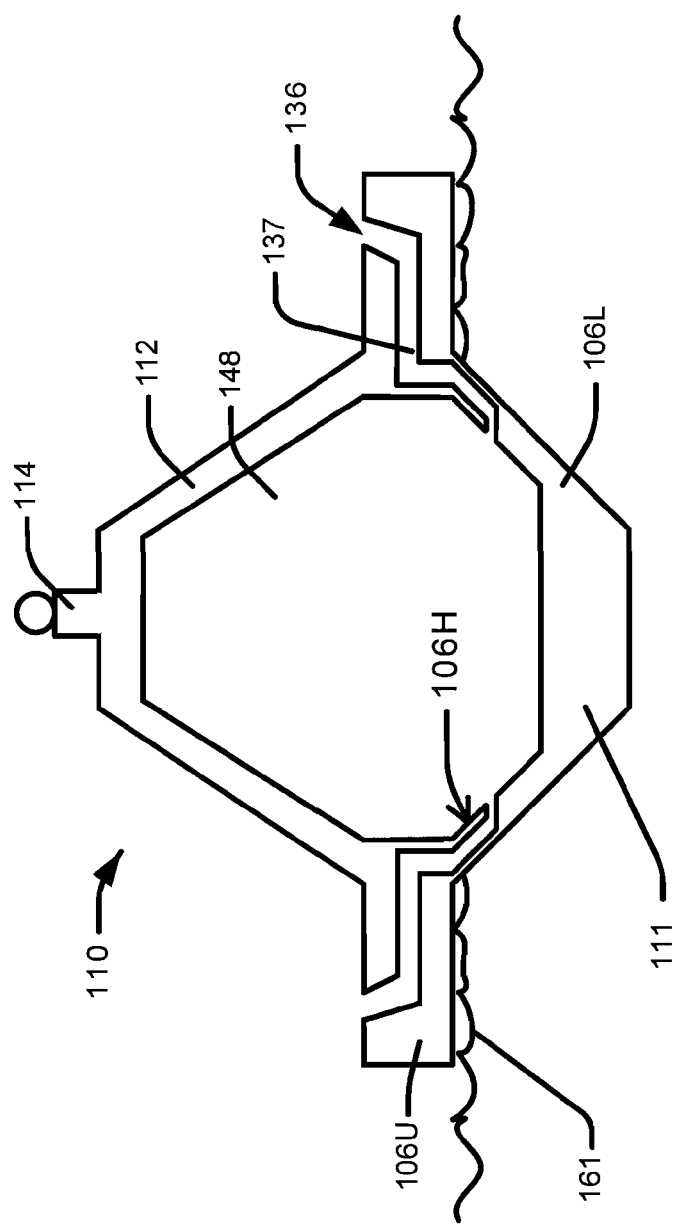
FIG. 3 is partial cut away cross-sectional view roughly thru axis 3/3' as shown in FIG. 2 according to an example embodiment of the present invention.
Figure 4:
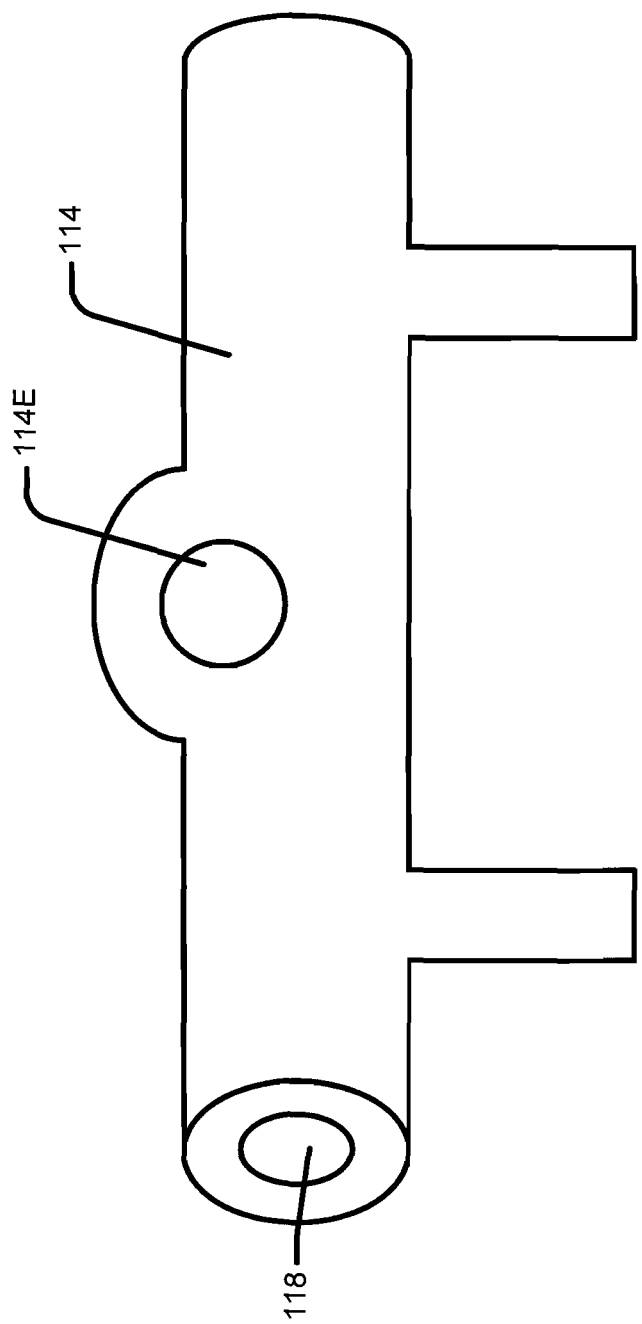
FIG. 4 is a three dimensional perspective view of a handle of a carrier according to an example embodiment of the present invention.

FIGS. 2, 3 and 4

Another example embodiment is shown in FIGS. 2, 3 and 4. FIG. 3 is a partial cross-sectional view taken along the axis 3/3' in FIG. 2. FIG. 4 is a 3D perspective of an example handle.

FIG. 2 shows a carrier 110 comprised of a base 111, bottom of base 111B, top (surface) 111T of base, and housing 112.

The base 111 is preferably adapted to float on water and adapted to be pulled and/or pushed over water. The base has a top and bottom. The top has a top horizontal cross-sectional area and the bottom has a bottom horizontal cross-sectional area. The top horizontal cross-sectional area is greater than or equal to the bottom horizontal cross-sectional area. The top horizontal cross-sectional area is measured as the area (of the outer perimeter) of a substantially horizontal plane thru the top of the base. The bottom horizontal cross-sectional area is measured as the area (of the outer perimeter) of a substantially horizontal plane thru the bottom of the base.

In an option, the cross-sectional area of the base along a horizontal plane gets smaller from the top to the bottom.

In an option, the base consists of at least 85 volume % of a material that has a density less than water.

The base can have a front and a back. The front can be the same width or narrower than the back. In an option, the cross-sectional area of the base can decrease from the top of the base going down to the bottom of the base.

The base 111 can be comprised of an upper base (also can be called stabilization rim) 106U and a lower base 106L. The upper bass and lower base can be connected together. The upper base and lower base can be attached together or can be one piece molded together. The stabilization rim 106U can have a horizontal cross-sectional area of between about 105 to 150% of the horizontal cross-sectional area of the top surface 111T of the lower base 106L, and preferable between about 110 to 120% of the horizontal cross-sectional area of the top surface of the lower base 106L. In an option, the stabilization rim has a substantially rectangular (top down view) shape.

The upper base (or stabilization rim) 106U can consist of at least 85 volume % of a material(s) that has a density less than water. In an option, the upper base 106U can consist of at least 95 volume % of a material(s) that has a density less than water. In an option, the upper base 106U can essentially consist of a material(s) that has a density less than water. For example, the upper base 106U can be comprised of a (floatation) foam, such as polyurethane foam (foam rubber), Styrofoam or some other solid polymer colloid or foam. In another example, the upper base 106U has a density less than water, such as a gas filled plastic tube. The carrier can be constructed so that the carrier containing an animal, will float with a water level at or below the top of the stabilization rim 106U. The stabilization rim 106U can reduce the rocking motion of the carrier in water. The stabilization rim 106U can provide additional floatation or buoyancy in rough waters or while being pushed or pulled or moved over water.

The lower base 106L can be comprised of a water proof material that may or may not have a density less than water. For example, the lower base can be comprised of waterproof plastic, such as PVC. The lower base 106L can be comprised of a material with a density less than water to provide additional buoyancy.

The lower base 106L can be attached to the upper base 106U such as by using a water tight or water proof glue or sealant, such as an epoxy or fiberglass resin. In an option, the lower base consists essentially of a water proof material, such as a polymer or plastic, and the upper base 106U consists essentially a material with a density less than water, such as a foam.

In an option, the base 111 is not comprised of an air mattress or air pocket(s).

The housing 112 can have an attachment means for transporting the carrier. The attachment means can comprise: a handle, hook, snap, or a hole. For example, a handle 114 is connected to the carrier. A line or rope can be attached to the attachment device to lower or raise the animal carrier.

A door 116 can have two door hinges 115.

The base can have handles 126 144 on sides of base.

The housing 112 can have vents 132. A cavity 148 is formed in the carrier which can hold an animal.

The housing 112 can be attached to the base 111. The housing 112 can be attached to the base 111 by using fasteners, such as screws, or an adhesive.

A. Drain—FIG. 3

FIG. 3 is a cut away cross-sectional view roughly thru axis 3/3' as shown in FIG. 2.

FIG. 3 shows an option for the drain base orifice 136 and the drain opening or drain passageway 137. Other configurations are possible.

FIG. 3 shows the carrier 110 floating high up in water 161. The water line could be higher up on the upper base so that the water line is touching and supporting the upper base 106U. (See e.g., FIG. 8) This allows the upper base 106U to stabilize the rocking motion of the carrier in water.

B. Handle—FIG. 4

As shown in FIG. 4, in an aspect, the handle 114 can have a light 118 and an eye hook 114E. The light can be a battery powered light like a flashlight.

C. Additional Descriptions of Example Embodiments

Below are descriptions of example embodiments that can refer to FIGS. 2, 3 and 4.

This lightweight Pet carrier/cage can float and be lowered into water for emergency purposes.

The example embodiment relates to a lightweight pet cage that can float and be lowered in water for emergency purposes.

The cage is comprised of the following components. It can be made of plastic and foam. It has a handle with a built in flash light and eyehook. The Handles on both sides are can be used to for a person to swim alongside the carrier and hold onto the handles.

In an embodiment, the cage door opens midway front to top. Located at the bottom of the cage are two drain ports that allow water to discharge to water level if and when water enters the cage.

A lowering rope can be provided with this cage in conjunction with the eyehook

The cage opens from the front. This cage design opens from midway front to top. The handle has a built in flash light and eyehook. A lowering rope is also provided. The swimming handles can be similar to a lifeguard's swimming board.

The components are helpful and are used together to ensure a safe rescue.

There are many sizes of pets. There would be different size cages.

If the pet is rescued in contaminated water, the drain ports on each end can be used as a plug and hose that would allow you to bathe the animal. After the pet has been sanitized you could easily remove the plug and run the water until the dirty water has been cleared. This would benefit the handler when removing the animal from the cage.

The cage is similar to a standard cage, but the bottom is designed somewhat like a raft.

It can be used as an everyday cage for your pet.

During and after weather related flooding situations, a pet would need shelter and safety. Many people leave their pets behind. The animal carrier would insure a better chance of survival. This has many features that benefit the owner in emergency situations. It can be lowered into water or ground from rooftop. It can also be connected to other prototypes of this kind, which makes this easier for animal rescue response personnel. The animal can also be bathed in this cage. Drain ports are located on both ends midway. This cage stays afloat and it's easier to transport an animal rather than carry in flooded waters.

In an option, wheels can be connected with or to the base and the carrier can be pulled or pushed using the wheels. Also, a handle can be attached to the carrier (for example in the front or back of the carrier) to push or pull the carrier using the wheels. See for example, FIG. 7 that shows wheels 264 that could be mounted on the base 111 and Handle 266 that can be attached to the carrier 110 of carrier 111 of FIG. 2.

IV. EXAMPLE EMBODIMENT OF CARRIER AND CARRIER PLATFORM

Figure 5:
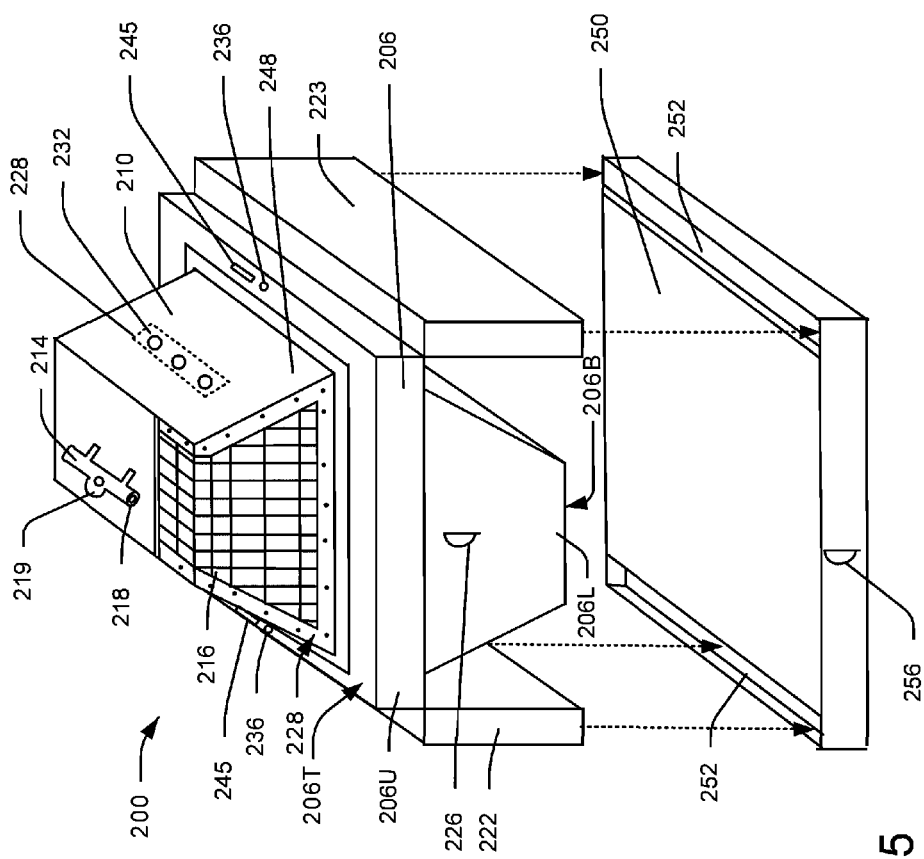
FIG. 5 is a three dimensional perspective view of a carrier and platform according to an example embodiment of the present invention.

FIG. 5 shows a three dimensional view of another example embodiment of the animal carrier 200 and an optional carrier platform 250. FIGS. 6, 7, 8, 9, 10, 11, 12 and 13 show views of options of the example embodiment in FIG. 5.

The carrier 200 can be comprised of a base 206, top housing 210 and optional floatation extensions 222 223.

Base 206, Housing 210 and Housing Cavity 248

The base 206 is connected with the housing 210. The base 206 and top housing 210 form a cavity 248 where an animal can be contained during transportation.

Figure 12:
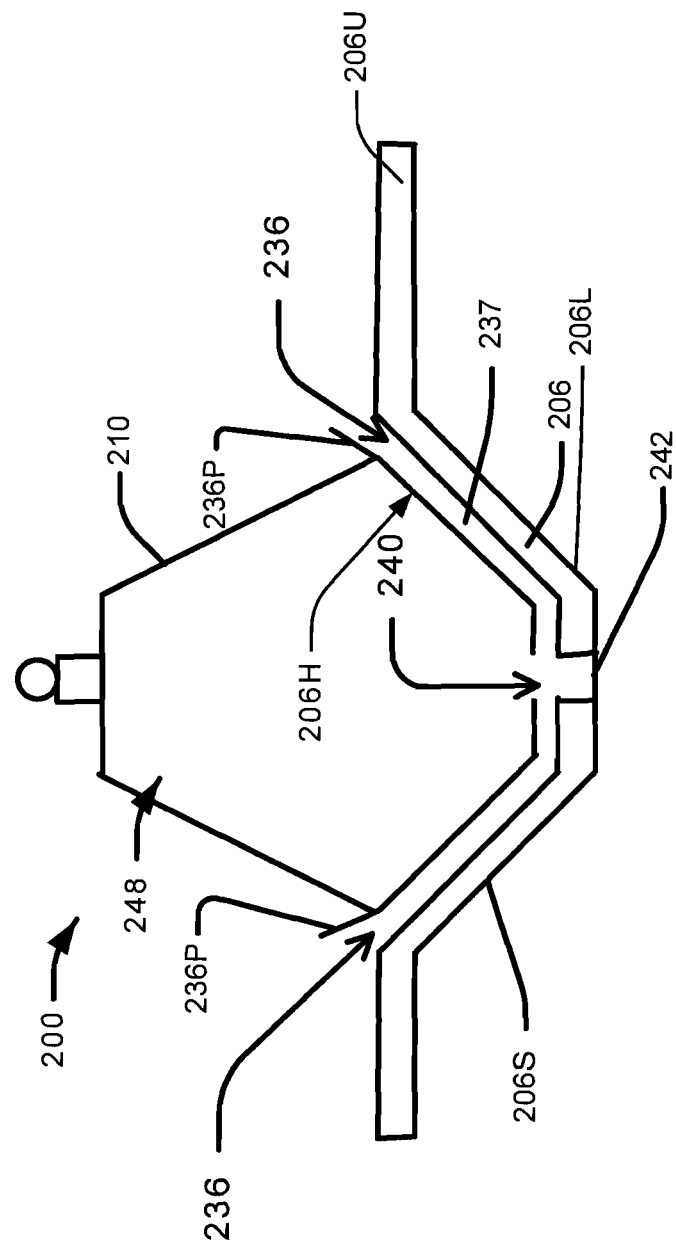
FIG. 12 shows a cross-sectional view of a carrier 200 according to an example embodiment of the present invention.

The base 206 can have a depression or hollow 206H as shown in FIG. 12. The base can also be flat or have a flat top surface without a hollow.

The base can have a square, rectangle, round, triangle, or any desired shape. The top 206T (surface) of base 206 can be connected with the housing using, for example, screws, glue, flange joint(s), or permanent sealed joint(s).

The base 206 can be permanent mounted, connected with or removably attached to the housing. The base 206 can be comprised of metal, high strength plastic (e.g., PVC), aluminum, stainless steel, fiber glass, wood or vinyl.

The base 206 can be formed using an air tight injection mold process.

The base can be an air tight shell mold filled with water proof polyurethane formula foam.

The base and enclosure can have the capacity to float in water bearing a weight in the cavity (such as for an animal) of at least 100 pounds or between 30 and 120 lbs.

The base is preferably adapted to float over water and also to be moved, pulled or pushed along over water. The (bottom horizontal cross-sectional area) area of the bottom 206B (surface) of the base 206 can be less than or equal to area (top horizontal cross-sectional area) of the top 206T of the base 206. This helps adapt the base to be pushed or pulled over the water. The base can be shaped similar a boat hull. The front of the base may be pointed, or may be narrower than the middle and back. The middle may be have a larger vertical cross-sectional area than the front or back (e.g., like a Kayak). The corners and edges of the base can be rounded.

The bottom horizontal cross-sectional area of the bottom 206B of the base 206 can be equal to or less than to area (top horizontal cross-sectional area).

The bottom horizontal cross-sectional area of the bottom 206B of the base 206 can be less than to area (top horizontal cross-sectional area) and the cross-sectional area can increase going from the bottom to the top. The sides can be tapered. The base can have a Y, U shape boat hull shape.

The base can a rectangular horizontal cross-sectional shape.

The base 206 can have the characteristics (such as buoyancy, shape, size, materials, density, etc) as the bases 11 and 111 described above. Those skilled in the art can substitute other materials that are less dense than water. In an option, the cross-sectional area of the base can decrease from the top of the base going down to the bottom of the base.

The base 206 can be comprised of an upper base 206U section and a lower base section 206L. The upper base and lower base can have the characteristics as described above in other embodiments. The upper base 206U section can increase the stability of the carrier when floating in water. Also the upper base 206U can increase the buoyancy of the carrier, especially when the upper base is comprised of a material substantially less dense than water (such as about the density of styrofoam). The base 206 is preferably has a size, area, shape and is comprised of material(s) less dense than water so that the base will float carrying an animal so that the water level is not significant over the top of the upper base 206U.

The upper base or rim stabilizer 206U can have a thickness between 1 and 6 inches and more preferably between 1 and 3 inches. The lower base 106L may have height (from rim stabilizer 206u to the bottom 111B of the lower base) of between 4 to 24 inches and more preferably between 6 and 10 inches. The distance 111D between the housing 112 and the edge of the upper base 106U may be between 1 and 12 inches and more preferably between 2 and 6 inches.

On the bottom 206B of the base, an optional recess can be formed to fit the handle 214 for stacking carriers. If one carrier were stacked on top of another carrier, the handle of the lower carrier would fit into a recess in the bottom of the upper carrier. The recess could be similar to the recess 260 in the platform 250 shown in FIG. 11.

The inside lower hollow formed in the base can be used as a wash tub.

A pillow or fitted cushion can be inserted in bottom of the cavity for a bed for an animal. The animal could be tethered to the carrier in the cavity.

Housing 210

The housing 210 may be connected to the base 206. The bottom of top housing can be connected to lower base using screws, glue, flange joint(s), gasket(s), or permanent sealed joint(s).

The top housing can have a square, rectangle, round, triangle or any desired shape and is preferably rectangular.

The bottom width of the housing is preferably wider or equal to width of the top of the housing and is preferably wider. The housing 210 can be formed using an air tight injection mold. The housing 210 can be permanently mounted or removable attached to the base 206

The housing can be not insulated or insulated between multiple walls.

The housing 210 can be comprised of metal, high strength plastic (pvc), aluminum, stainless steel, fiber glass, wood or vinyl.

The housing can be comprised of a rigid material adapted to support the weight of a second carrier thereon. Alternatively, a support frame can be provided under an outer water proof shell. The support frame could support extra weight.

The carrier or housing could be a bright color, such as orange to aid in seeing the carrier.

Food and/or water can be placed in the cavity for the pet.

Floatation Extensions 222 223

Referring to FIG. 5, first and second (e.g., left and right) floatation extensions 222 223 are attached to or connected with the carrier. The base 206 can further comprise flotation extensions 222 223 that are preferably connected with the upper base 206U.

The floatation extensions are preferably rotatably attached to the base, for example using hinges. See for example, FIG. 9, hinges 206H. The floatation extensions can be in a lowered position as shown in FIG. 5. In FIG. 5, the floatation extensions are shown with dashed arrows being inserted into slots 252 in a platform 252.

Figure 8:
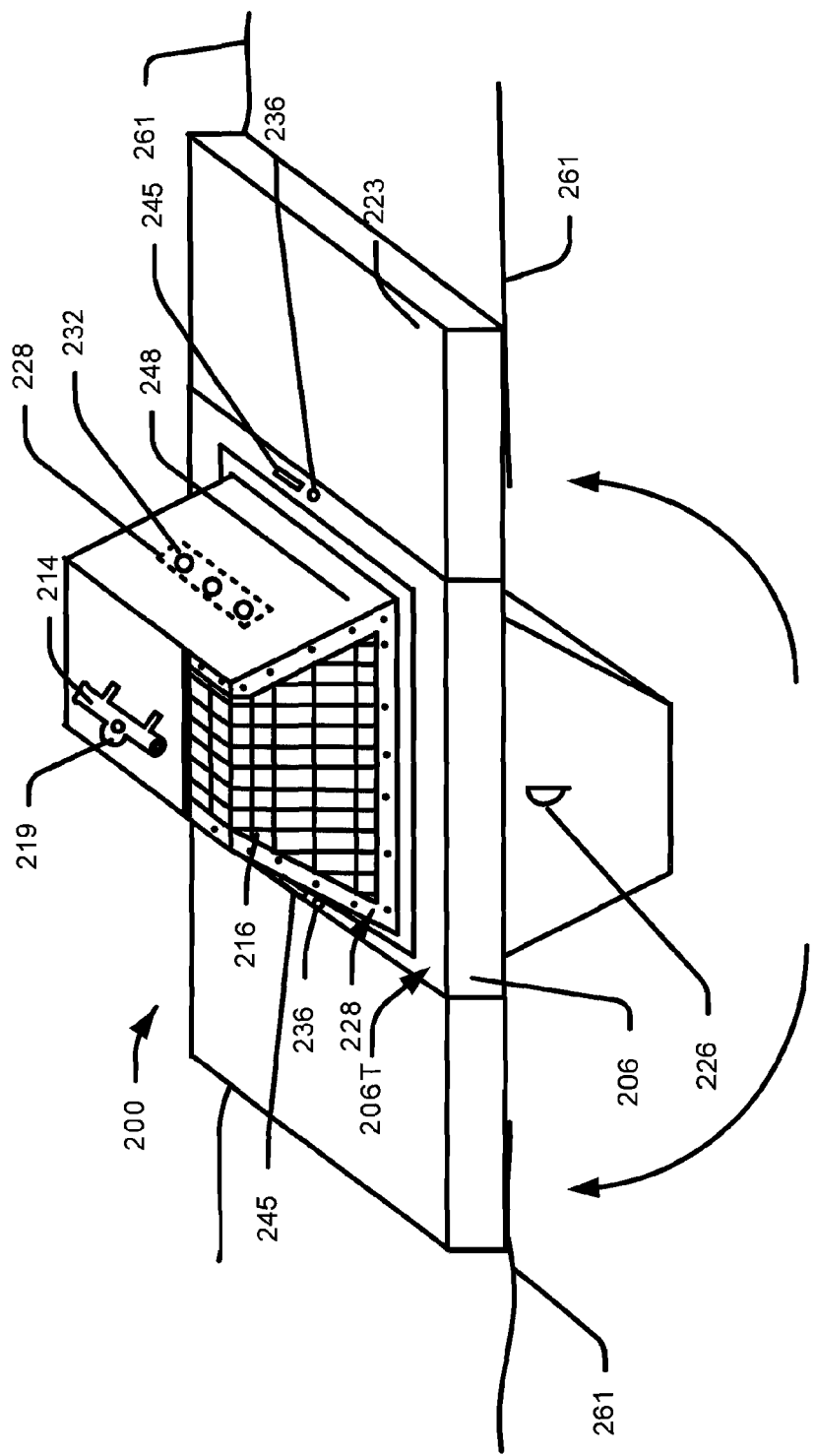
FIG. 8 is a three dimensional view of a carrier with the floatation extensions 222 223 in a raised position according to an example embodiment of the present invention.

The flotation extensions can be raised as to be roughly even and parallel with the base 206 as shown in FIG. 8. In addition the flotation extension can be raised to a vertical position (e.g., about 90 degrees straight up). This would allow the floatation extensions 222 223 to be long and stored or carried in the vertical up position, especially when the carrier is on the platform 250. The flotation extensions can also be called flotation flares or wings. The floatation extension can stabilize the carrier 200 in the water 261 as shown in FIG. 8.

The left extension 222 and right extension 223 can be removed or fastened, (screwed), and permanent mount of 90 degrees across.

The floatation extensions can have square cubic, rectangular, round cylindrical, triangle 3D, or any desired shape. The floatation extensions are preferably less dense than water (e.g., buoyant). The floatation extensions can substantially consist of water buoyant materials.

The floatation extensions can be formed of polymer material, such as foam, with a density less than water. The floatation extensions can be formed an injectable plastic surrounding an gas pocket using an air tight injection mold. Those skilled in the art can substitute other materials that are less dense than water.

The floatation extensions can be formed of several layers of foam sandwiched between plastic liners.

Floatation extensions in a down position are preferably extend down equal or longer than the bottom of the lower base 206.

Floatation extensions extend lower than bottom base will allow space between handles for stacking carriers.

Figure 6:
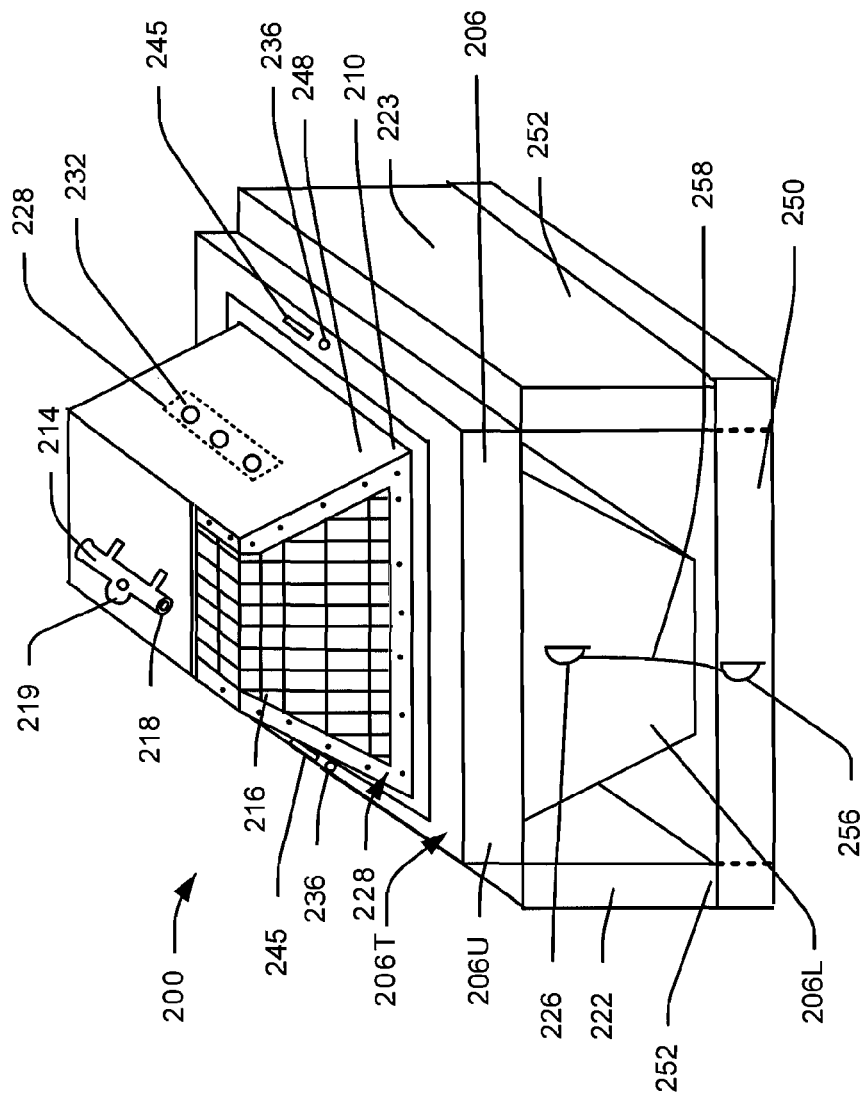
FIG. 6 is a three dimensional view of a carrier and platform with the floatation extensions 222 223 in slots 252 in the platform 250 according to an example embodiment of the present invention.

When in the down position, floatation extensions can extend lower than bottom base and the floatation extensions can be inserted into slots 252 in a lower platform base 250 (as shown in FIGS. 5 and 6).

The floatation extensions can be comprised of metal, high strength plastic (pvc), aluminum, stainless steel, fiber glass, wood or vinyl.

The floatation extension are sized to provide stability of the carrier in rough water and to allow proper buoyancy of the carrier and animal in water. Example dimensions of the extensions 222 and 223 can be length between about 2 to 9 feet and more preferably 2.5 to 5 feet; a width between 4 inches to 48 inches and more preferably between 6 inches to 10 inches; and a height between about 1 to 6 inches and more preferably be 1 and 3 inches.

FIG. 8 shows the floatation extensions 222 223 raised to the up position so the floatation extensions form an about horizontal extension of the base 206. The floatation extensions 222 223 when raised to the up position, provide stability for the entire carrier when the carrier is in water and for swimming (e.g., life guard board).

Handle 214

Referring to FIG. 5, a handle 214 is shown having an optional built in light 218 and eye hole 219.

The handle(s) can be located at center top or multiple areas of carrier. The handle is preferable water resistant. The handle can be screw mounted between top and bottom piece of aluminum of the housing wall. The center of the handle can be reinforced made eye hook. The handle preferably raises 90 degree, lowers 90 degree, and can include a locking device. The handle can be permanently mounted or removably mounted on the housing. The handle can be comprised of: metal, high strength plastic (e.g., PVC), aluminum, stainless steel, wood, fiber glass. Handle can be mounted with or without built in eye hook and flash light.

The flash light 218 can be a halogen, incandescent, flashing indicator, low high beam. Switch on the flash light can be an auto sensor-manual; single pole-single throw, single pole-double throw, location at handle or any part of carrier. The flash light can be powered by a battery, or solar (converter ac-dc, dc-ac). The handle shape can be round, rectangle, triangle, oval, square.

Cage Door—

Referring to FIG. 5, the top housing 210 can comprise a cage or front door 216. The cage door can comprise bars (or cross beams) with openings between the bars. The door 216 can opens front to top, or top to bottom. The door 216 can be hinged on top and center or bottom and center.

The door 216 can have latches on the top or bottom, left to right. The latches can be manual, auto spring loaded. The cage door can be caged doors or solid doors, ⅓ solid, ⅔ caged, ⅓ caged, ⅔ solid, ½ solid ½ caged.

The bottom of the door is preferably wider or equal width to top.

The door can be comprised of metal, high strength plastic (PVC), aluminum, stainless steel, and/or fiber glass. The door 216 can be permanent mount, or removable to the top housing 210. The doors 216 can be located front and or both ends of carrier.

Drain Openings

As shown in FIG. 5 and/or FIG. 12, drain openings 236 can be formed the base 206 Drain plugs and drain ports can have one or multiple locations at any part of carrier.

Upper Housing Air and or Light Vents 232

As shown in FIG. 5, upper housing air and or light vents 232 can be at any angle, size, shape, or design. Multiple vents can have any location at upper housing.

Optional shutters can be located between inner and outer walls of vents. The carrier can be made without air vents. A slider vent or vents can be used for feeding.

Power Pack—Voltage Adapter 244

One or more Power pack-voltage adapter 244 such as, 12 volt or any direct current adapter, can be located at any area of carrier. Plugs, power cord, or adapters are either male or female connectors located in a water sealed slider-door (as seen in FIG. 5). Power cord is powered by DC batteries (rechargeable, solar), AC-DC converter, DC-AC converter, Adapters power any accessory used for this carrier.

Cover

Covers can be used to drape over carrier door opening, vents 232, or the entire carrier. The covers are preferably water resistant or water proof.

Covers can be attached to carrier with fasteners 228, such as buttons, Velcro. Female to male seam attachment Covers can have any custom design with a picture or pictures of any name or print. The covers can be comprised of canvas, leather, plastic, or vinyl.

Carrier Platform 250

Carrier platform 250 can have any shape or design compatible with the carrier 252. Floatation extensions 222 223 at a down position can be inserted into platform's slots 252 to mount carrier (as seen in FIG. 6).

The carrier platform 250 and floatation extensions 222 223 at 90 degrees down position can be mounted flush to platform, attached with straps at the front and rear using the carrier's and platform's eye hooks, same when floatation extensions are inserted into slots 252 (as seen in FIG. 6).

The carrier can include two flotation extension 222 223 rotatable attached to the base. The carrier can be positioned over the platform wherein the two flotation extensions at least partial fit into the slots.

Located underneath the platform is a (optional) compartment(s) for storage and a recessed cavity for staking carriers. The platform 225 may have a thickness between 1 and 4 inches. The length and width of the platform may be compatible with and depend on the dimensions of the carrier.

Wheels with Platform

Figure 7:
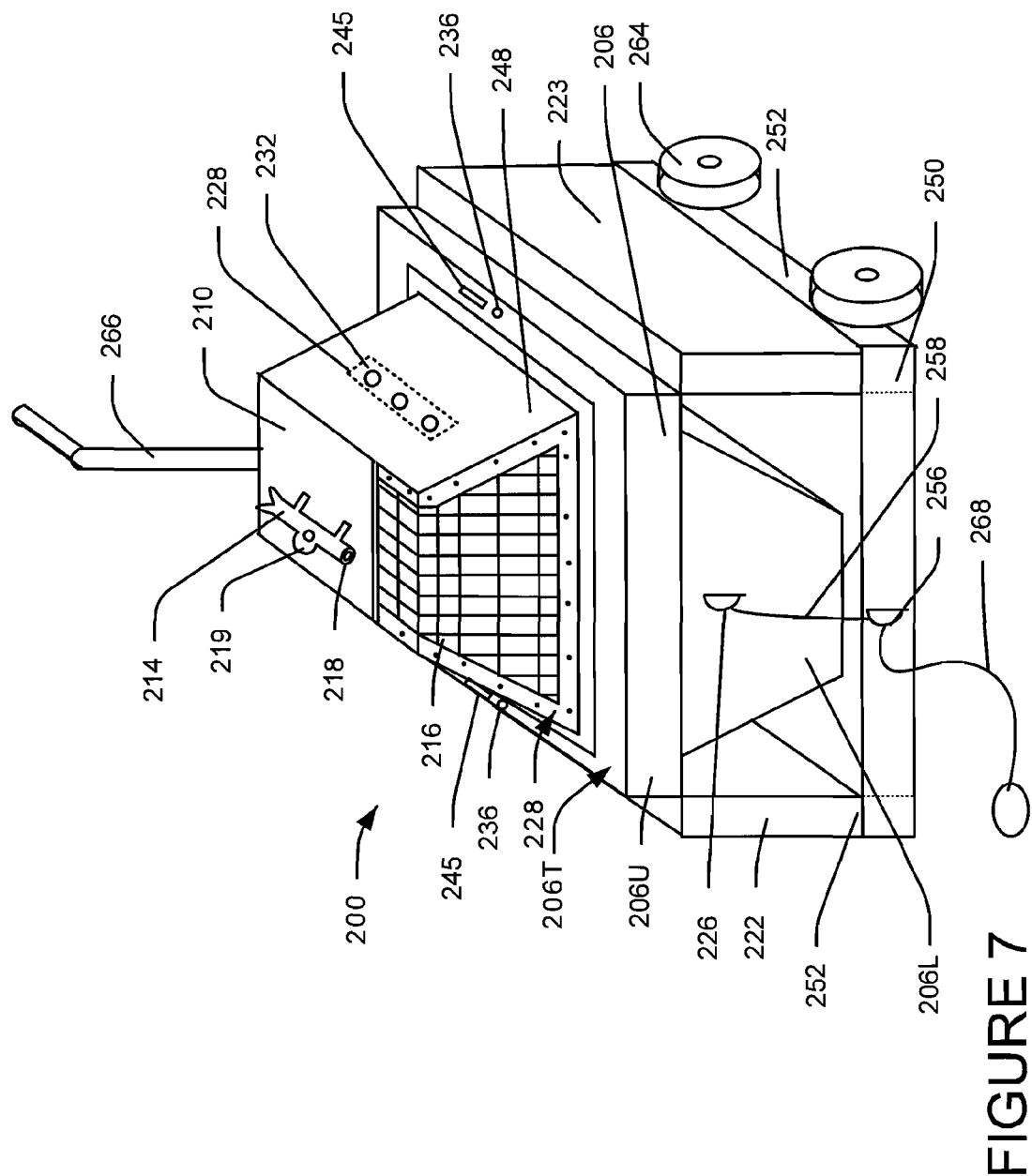
FIG. 7 is a three dimensional view of a carrier and platform with the floatation extensions 222 223 in slots 252 in the platform 250 and wheels 264 and a handle 266 according to an example embodiment of the present invention.

FIG. 7 is a three dimensional view of a carrier and platform with the floatation extensions 222 223 in slots 252 in the platform 250, wheels 264 and a handle 266 according to an example embodiment of the present invention.

Wheels 264 can be installed on any part of platform 250. Preferably, four wheels are connected with the platform (In FIG. 7, the platform has 4 wheels, two on the far side are blocked by the carrier). The wheels can be mounted so that the wheels can swivel to help the platform turn better. The platform and attached carrier can then be pushed or pulled using the wheels. The platform and carriers can be pushed or pulled at either end of carrier with line(s) 268 (e.g., rope(s) or handle(s) 266. The handle(s) 266 can be used to push or pull the carrier and platform.

Identification plates can be mounted on platform and or carrier. The wheels can be comprised of metal, high strength plastic (e.g., PVC), wood, fiber glass, aluminum, stainless steal or vinyl.

Ring Hooks 226 on Base

As shown in FIGS. 5 and 6, ring hooks 226 on base can be located front and back of carrier 200 and base 206 or any other location.

A strap or tie down can be used to attach to the carrier and base platform ring hooks. The ring hooks 226 can be used for towing, lifting or stacking.

Ring Hooks 256 on Platform 250

As shown in FIGS. 5 and 6, ring hooks 256 on platform 250 can be located front and back of platform 250 or any other location.

Referring to FIG. 6, a strap or tie down device 258 (e.g., rope) can be used to attach to the base and platform ring hooks 226 256. The ring hooks 256 can be used for towing, lifting or stacking.

A. Floatation Extensions in Slots in the Platform

FIG. 6 is three dimensional view of a carrier and platform with the floatation extensions 222 223 in slots 252 in the platform 250 according to an example embodiment of the present invention. FIG. 6 shows the carrier attached to the platform using the line 258.

B. Carrier 200 with the Floatation Extensions 222 223 in a Raised Position

FIG. 8 is a three dimensional view of a carrier 200 with the floatation extensions 222 223 in a raised position according to an example embodiment of the present invention.

C. Base 206 with the Floatation Extension 222 in a Raised Position and Floatation Extension 223 in a Lowered Position FIG. 9 is a three dimensional view of a base 206 with the floatation extension 222 in a raised position and floatation extension 223 in a lowered position the according to an example embodiment of the present invention.

Figure 9:
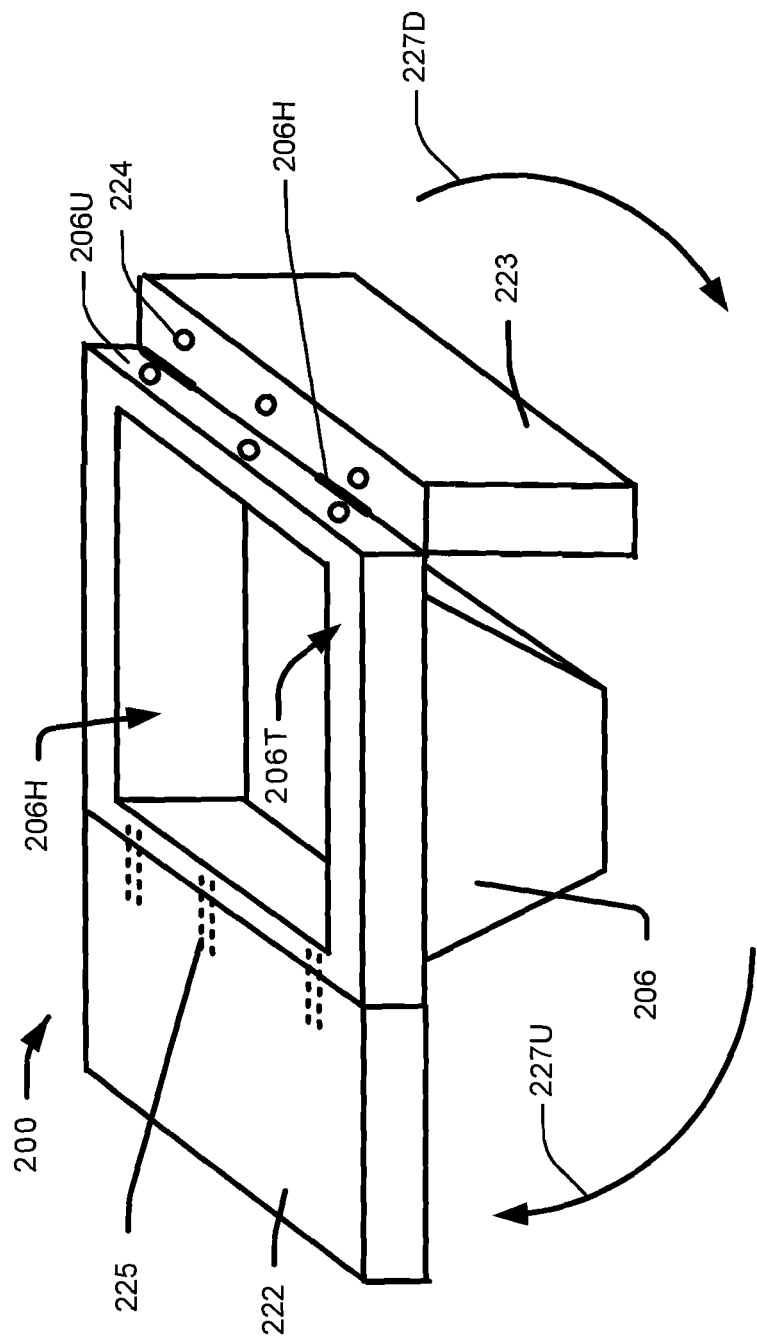
FIG. 9 is a three dimensional view of a carrier with the floatation extension 222 in a raised position and floatation extension 223 in a lowered position the according to an example embodiment of the present invention.

FIG. 9 shows support holes 224 and support hole with support device (e.g., bolt) 225 that can extend partially thru the flotation extensions 222 223 and the upper base section 206U. A bolt can be inserted to help support the flotation extensions 222 223 in the up position (see FIG. 9, extension 222 in raised or up position. The arrow 227U shows the extension 222 can rotate into the upwards direction. The arrow 227D shows the extension 223 can rotate into the downwards direction.

D. Platform

Figure 10:
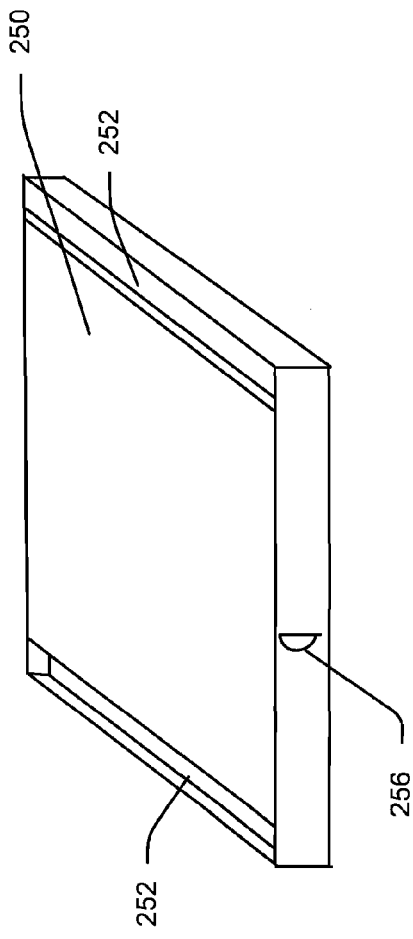
FIG. 10 shows a three dimensional view of the top of a platform having slots according to an example embodiment of the present invention.

FIG. 10 shows a three dimensional view of the top of a platform having slots 252 according to an example embodiment of the present invention.

Figure 11:
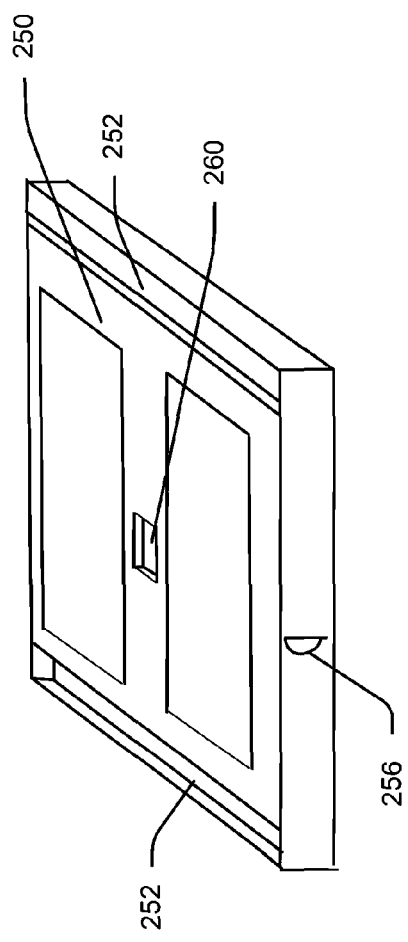
FIG. 11 shows a three dimensional view of the bottom of the platform 250 showing opening 260 and opening 262 according to an example embodiment of the present invention.

FIG. 11 shows a three dimensional view of the bottom side of the platform 250 showing a handle opening 260 and second openings or storage compartments 262.

E. Drains—FIG. 12

FIG. 12 shows a cross-sectional view of a carrier 200 in FIG. 5 according to an example embodiment of the present invention.

As shown in FIG. 12, a cavity drain opening 240 can be in the bottom of the base 206 in the cavity 248 formed by the housing 210 and the base 206.

Drain plugs 236P and drain ports 236 can have one or multiple locations at any part of carrier. Optional check valves can be installed in any drain opening to prevent water from coming into the cavity.

Drain plugs can be removed and used as openings/ports. Drains located in lower cavity have a direct discharge from carrier and in line discharge with upper ports as seen in FIG. 12, An upper port 236 can be used as a clean water fill for bathing. Removing plug from another upper port with fill on can be used as a rinse.

Submersible or in line pump or pumps can be connected in line with upper ports for high level discharge. Pumps can be powered by a DC Battery mounted on the carrier.

Drain plug types can be O-ring and metal screw, rubber cork (expandable), quick connect, PVC plug male and female thread, valve. Drain plugs come in any shape or size. The drain plugs can be comprised of metal, high strength plastic (pvc), wood, fiber glass, aluminum, stainless steel or vinyl.

Quick Connects in Ports 236

In an option, left and right ports 236 (female) are designed for (male) quick connects. (Male quick connects quantities (2) check valves and (2) female hose bib.) Quick connects can be inserted into the ports 236. The quick connects can attach a hose to the drain ports 236. In an options, check valves can be in the ports when floating on water.

Figure 13:
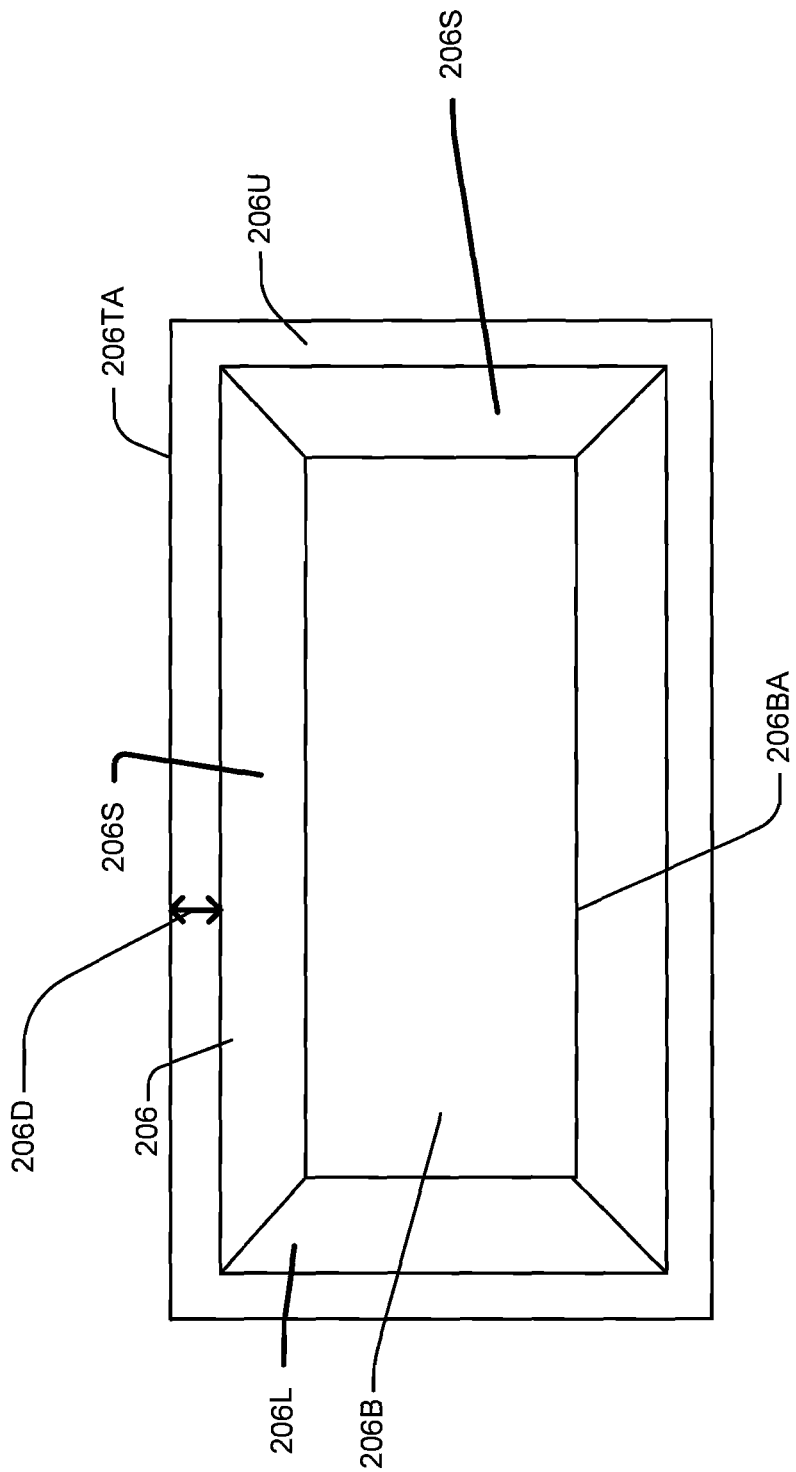
FIG. 13 shows a bottom up view of a carrier base according to an example embodiment of the present invention.

FIG. 13 shows a bottom up view of an example embodiment of the base 206 shown the bottom 206B of the base having a flat rectangular bottom and sloping sides 206S (see e.g., cross-sectional view FIG. 12. This base bottom shape can be implemented on the base embodiments described herein, such as FIGS. 2, 3, 5, etc. The bottom horizontal cross-sectional area is represented by lines/plane 206BA. The top horizontal cross-sectional area is represented by lines\plane 206TA.

Example dimensions for the Base in FIG. 13 (also similar dimensions can be used in examples shown in FIGS. 2, 3, 5, etc.) are as follows:

The base bottom 206B can have a width between 0.5 and 4 feet and more preferably between 1 and 2 feet, and a length between 1 and 8 feet and more preferably between 2 and 4 feet. The base bottom can be flat to allow the base to sit even on the ground or stacked onto of another carrier.

The top horizontal cross-sectional area is represented by lines\plane 206TA can have a length between 2 and 9 feet and more preferably between 2.5 and 5 feet, and a width between 1.5 and 4.5 feet and more preferably between 1.5 and 2.5 feet.

The distance 206D of the upper base 206U can be between 1 and 6 inches and more preferably between 1 and 4 inches. The actual distance 206 may be determined by the contribution to carrier buoyancy of the upper base 206 and/or the stability in water.

Cleaning Process

The cage or an animal in a cage/carrier can be cleaned using a five step process.

1) remove one the check valves.
2) add sanitizing solution into a port.
3) insert female hose bib into port. Connect a water hose and begin to fill the cavity until full.
4) after soaking is complete, remove the other check valve and turn water/fill back on. Discharge dirty water from port until water is clear.
5) drain port 242 flush mounted mail treaded plug located it the lowest point of the carrier base. Remove plug and drain water from the carrier.

V. METHOD OF USING AN ANIMAL CARRIER

An example embodiment of a method of rescuing animals comprising the steps of:
   providing an animal carrier;
      the animal carrier comprising a housing connected with a base to form a cavity wherein an animal can be contained in the cavity;
      base is adapted to float on water and to be moved over water;
         optionally, the base has a top and bottom, the top has a top area and the bottom has a bottom area; the top area is greater than or equal to the bottom area.
   placing an animal in a pet carrier;
   transporting the animal in the carrier by moving the carrier over the water.

An option further includes: lowering the animal carrier from a vertically higher point to a vertically lower point by attaching a line to the handle of the animal carrier and lowering the animal carrier.

The carrier can be towed behind a boat in the water.

A. Example Uses of the Animal Carrier

The example embodiments of the animal carrier can be used to rescue animals such as during floods. The animal carrier is adapted to float on water, to be towed or pushed over water (such as behind a boat). The carrier can be stacked for easier transportation, such as in a rescue vehicle or boat. The carrier can be used to hold the animal. The carrier can have attachment devices which can be used to attach rope thereto. The carrier can be raised or lowered, and pushed or pulled.

During and after weather related flooding situations, a pet would need shelter and safety. Many people leave their pets behind; the animal carrier would insure a better chance of survival. This carrier has many features that benefit the owner in emergency situations. It can be lowered into water or ground from rooftop. It can also be connected to other prototypes of this kind, which makes this easier for animal rescue response personnel. This cage stays afloat and it's easier to transport an animal rather than carry in flooded waters.

It is noted that 2 or more carriers could be fastened together and towed/pushed over the water.

The animal can also be bathed in this cage. Drain ports are located on both ends midway.

Some example features of some example embodiments include:
   floatable carrier
   shape of base so can tow carrier over water
   material of base is water buoyant
   carrier can be towed by boat
   stackable carriers
   stackable carrier with platforms
   attachment means for towing and lifting carriers In the event of a flood like Katrina, rescuers had to use boat to rescue people and their pets from their home while flood waters were still high.

The example embodiment's animal carriers could be used the rescue the animals. The carrier could be stacked in a boat or pulled in the water behind a boat to get to the correct place. The carrier could be raised up or delivered to the right place by ropes attached to the handles or hooks/loops on the carrier.

The animal could be safely placed into the carrier using the door. The carrier and animal could be lower or moved using the ropes attached to the carrier. The carrier animal could be stacked in the boat (to save space) or towed behind the boat.

B. Terms

Buoyancy is the upward force on an object produced by the surrounding liquid or gas in which it is fully or partially immersed, due to the pressure difference of the fluid between the top and bottom of the object. The net upward buoyancy force is equal to the magnitude of the weight of fluid displaced by the body. This force enables the object to float or at least to seem lighter.

Foam—is a polymer substance that traps air bubbles within, such as polyurethane foam (foam rubber), Styrofoam or some other manufactured foam. It can be considered a type of colloid.

C. Partial list of elements
Below is a partial (incomplete) list of some elements

| element # | name |
|---|---|
| 10 | carrier |
| 11 | base |
| 11B | bottom of base |
| 11T | Top of base |
| 12 | housing |
| 14 | handle |
| 15 | door hinge |
| 16 | door |
| 17 | door latch |
| 18 | light |
| 19 | hook |
| 20 | compartment for lowering rope |
| 26 | (swimming) handles on base |
| 27 | line (e.g., rope) |
| 32 | vents |
| 36 | drain opening in base |
| 37 | drain opening thru base |
| 48 | cavity |
| 80 | animal |
| 106L | lower base |
| 106U | upper base |
| 110 | carrier |
| 111 | base |
| 111B | bottom of base |
| 111T | top of base |
| 112 | housing |
| 114 | attachment device (e.g., handle) |
| 114E | eye hook |
| 115 | door hinge |
| 116 | door |
| 118 | light |
| 126 | handles on base |
| 132 | vents |
| 136 | drain base orifice |
| 137 | drain opening |
| 144 | handles on sides of base |
| 148 | cavity |
| 161 | water |
| 161N | water line |
| 200 | carrier |
| 206 | base |
| 206H | hollow or depression in base |
| 206B | bottom of base |
| 206T | top of base |
| 206L | lower base |
| 206U | upper base |
| 210 | housing |
| 214 | handle |
| 216 | door |
| 218 | light |
| 219 | hook |
| 222 | flotation extensions |
| 223 | flotation extensions |
| 223H | hinges |
| 224 | support holes |
| 225 | support holes with support device (e.g., bolt) |
| 226 | hooks on base |
| 227U | arrow upwards |
| 227D | arrow downwards |
| 228 | fasteners for covers |
| 232 | vents |
| 236 | drain orifice in base |
| 236P | drain plug |
| 237 | drain opening |
| 240 | cavity drain orifice in base |
| 242 | drain plug |
| 244 | power pack - voltage adapter |
| 248 | cavity |
| 250 | carrier platform |
| 250 | carrier platform with |
| 252 | slots in carrier platform for flotation extension |
| 256 | hooks on carrier platform 250 |
| 258 | tie down device (e.g., line) |
| 260 | opening in platform 250A |
| 264 | wheels on platform |
| 266 | handle on platform |
| 268 | line (e.g., rope) |

D. Non-Limiting Example Embodiments

Unless explicitly stated otherwise, each numerical value and range should be interpreted as being approximate as if the word about or approximately preceded the value of the value or range.

Given the variety of embodiments of the present invention just described, the above description and illustrations show not be taken as limiting the scope of the present invention defined by the claims.

While the invention has been particularly shown and described with reference to the example embodiments thereof, it will be understood by those skilled in the art that various changes in form and details may be made without departing from the spirit and scope of the invention. It is intended to cover various modifications and similar arrangements and procedures, and the scope of the appended claims therefore should be accorded the broadest interpretation so as to encompass all such modifications and similar arrangements and procedures.

What is claimed is:

1. A portable carrier comprising:
a rectangular non-inflatable buoyant base; an upper housing reversibly connected to the rectangular buoyant base about a lower periphery of the upper housing, the connected rectangular buoyant base and upper housing defining an enclosed area, the enclosed area adapted to house at least one pet; a door affixed to at least the upper housing and providing controlled access to the enclosed area; a single handle connected to the upper housing, the single handle adapted for (a) manually lifting the portable carrier, and the at least one pet, above a body of water, and (b) controlled manual movement of the portable carrier, and the at least one pet, across a surface of a body of water, by any person adjacent the portable carrier; and removable buoyant extensions hingedly attached to the exterior sides of the portable carrier, wherein the buoyant extensions oppose each other.

2. The portable carrier of claim 1 further comprising a door latch means for fastening the door to the portable carrier, wherein latching of the door latch means prevents egress of the at least one pet housed within the enclosed area.

3. The portable carrier of claim 1 wherein the door includes openings therein and sized to retain the at least one pet when within the enclosed area.

4. The portable carrier of claim 1 wherein the upper housing is non-inflatable.

5. A buoyant carrier comprising:
a non-inflatable base; an upper housing reversibly connected to the base about a periphery of the upper housing, the connected base and upper housing defining an enclosed area of the portable carrier; a door affixed to one of the base and the upper housing and providing ingress and egress to the enclosed area; a single handle connected to the upper housing; and one or more separate buoyant extensions hingedly connected to the base, wherein the one or more buoyant extensions oppose one another.

6. The buoyant carrier of claim 5 further comprising hinge means for connecting the door to the upper housing, and latch means for maintaining closure of the door, the latch means being removably connected to one of the base and the upper housing.

7. The buoyant carrier of claim 5 further comprising
a platform spaced apart from a bottom of the base, the spaced apart platform and the bottom of the base defining a cavity, and
one or more openings through the platform communicating with the cavity.

8. The buoyant carrier of claim 7 wherein any fluid within the enclosed area drains through the one or more openings to the cavity.

9. The buoyant carrier of claim 5 further comprising vent openings in an upper portion of the upper housing.

10. The buoyant carrier of claim 5 wherein the hinge means connects to an upper portion of the door such that the door rotates about the hinge means to open upwardly from the base to open, wherein an open door permits ingress to the enclosed area, and egress from the enclosed area.

11. The buoyant carrier of claim 5 wherein two or more buoyant extensions oppose one another.

12. The buoyant carrier of claim 5 further comprising an opening in the single handle.

13. The buoyant carrier of claim 5 further comprising an artificial lighting device in the single handle.

14. The buoyant carrier of claim 5 further comprising one or more ring hooks in said base.

15. The buoyant carrier of claim 5 wherein a bottom of the base and a top of the upper housing are configured so that two or more of the buoyant carriers are stackable, such that the base of one buoyant carrier fits over at least a portion of the top of the upper housing of another buoyant carrier.

16. The buoyant carrier of claim 15 wherein the door of each stacked buoyant carrier is configured to be in a dosed position or an open position, and openable and closeable in such respective positions.

17. The buoyant carrier of claim 4 wherein the upper housing is non-inflatable.

* * * * *